United States Patent [19]
Phaal

[11] Patent Number: 5,884,244
[45] Date of Patent: Mar. 16, 1999

[54] METHOD FOR MEASURING QUALITY OF SERVICE IN A COMPUTER SYSTEM

[75] Inventor: Peter Phaal, San Francisco, Calif.

[73] Assignee: Hewlett-Packard Company, Palo Alto, Calif.

[21] Appl. No.: 954,918

[22] Filed: Oct. 21, 1997

[51] Int. Cl.$^6$ .................................................. G06F 13/00
[52] U.S. Cl. ............... 702/186; 395/200.66; 395/200.67
[58] Field of Search .................................. 702/186, 182; 364/284.4, 280; 395/182.02, 185.08, 680, 182.16, 200.66–200.68, 670, 677

[56] References Cited

U.S. PATENT DOCUMENTS

| | | | |
|---|---|---|---|
| 4,807,118 | 2/1989 | Lin et al. ............................ | 395/200.67 |
| 5,272,651 | 12/1993 | Bush et al. ............................. | 364/488 |
| 5,396,613 | 3/1995 | Hollaar ............................... | 395/182.02 |
| 5,546,583 | 8/1996 | Shriver ..................................... | 395/680 |
| 5,581,482 | 12/1996 | Wiedenman et al. ................... | 702/186 |
| 5,684,992 | 11/1997 | Abrams et al. .......................... | 395/680 |

*Primary Examiner*—John Barlow
*Assistant Examiner*—Bryan Bui

[57] ABSTRACT

A method for operating a computer system having a plurality of software modules which interact with each other by sending and receiving messages. The computer includes a user interface which receives commands from a user and displays information to the user in response to those commands. The computer system is characterized by a latency time defined to be the time between the issuance of a command by the user and the receipt of information specified in the command. The messages received by at least one of the modules include messages for that module and messages that are to be passed to other modules. In the present invention, at least one of the modules is provided with code for recognizing a Latency Event which includes a message for that module that would not normally be received by that module if the computer system had a latency time of zero. This code also contains code for storing information specifying that a Latency Event was received by that module.

7 Claims, 1 Drawing Sheet

METHOD FOR MEASURING QUALITY OF SERVICE IN A COMPUTER SYSTEM

FIELD OF THE INVENTION

The present invention relates to computer systems, and more particularly, to a method for operating a computer to measure the quality of service being provided by a computer system.

BACKGROUND OF THE INVENTION

Modern computer systems have multiple components operating in a multi-tasking environment which makes it difficult to measure the satisfaction of the user with the performance of the various components. In general, the user initiates an action utilizing a pointing device and/or the keyboard. Often a delay is experienced between the time of initiation and a response from the computer. Such delays, if sufficiently long, result in user frustration with the system.

Such delays can be the result of an overload at any level of the multitasking system. For example, the time slice allocated to the user interface may be insufficient to allow the user interface to repaint its part of the screen within the same time slice as the initiation operation. If a large number of tasks are active on the system, the next time slice provided to the interface may be seconds away. Alternatively, the user interface may need to receive information from a server on the network before responding to the user. Delay in that server could be the cause of the delay. Accordingly, it is difficult to determine which part of the system is actually causing the delay.

Furthermore, the level of delay in receiving a response from the system that is acceptable to the current user of the system is not predictable. Individual users have widely varying tolerances for delays. Hence, a delay that is unacceptable to one user may be perfectly acceptable to a second user.

It would be advantageous to provide a method for measuring the level of user satisfaction in a computer system. Such a measurement could be used to allocate system resources to relieve user frustration when the system detects that a specific component in the system is introducing delays that are unacceptable to the users of the system. For example, the operating system could increase the time slice associated with the tasks of a user who was dissatisfied with the system's performance.

In addition, such measurements can be used by system planning personnel to identify components that need to be upgraded. Given the large number of components, the choice of which component to upgrade next is not always obvious.

One method for measuring the performance of a server is to measure the percentage of the capacity of the server that is being utilized. In principle, a server that is running near capacity will introduce delays into the system. However, a server that appears to be running well below capacity may not be providing "good" service to its users. Consider a server on the Internet. If the delays in delivering packets to the user are too great, the user will cancel the transaction. Hence, the server's total utilization may appear low; while the users of the server are dissatisfied.

Broadly, it is the object of the present invention to provide an improved method for measuring user satisfaction with a computer system.

It is a further object of the present invention to provide a method of identifying the individual components of a computer system that are responsible for generating the user dissatisfaction.

These and other objects of the present invention will become apparent to those skilled in the art from the following detailed description of the invention and the accompanying drawings.

SUMMARY OF THE INVENTION

The present invention is a method for operating a computer system having a plurality of software modules which interact with each other by sending and receiving messages. The computer also includes a user interface which receives commands from a user and displays information to the user in response to those commands. The computer system is characterized by a latency time defined to be the time between the issuance of a command by the user and the receipt of information specified in the command. The messages received by at least one of the modules include messages for that module and messages that are to be passed to other modules. In the present invention, at least one of the modules is provided with code for recognizing a Latency Event which includes a message for that module that would not normally be received by that module if the computer system had a latency time of zero. This code also contains code for storing information specifying that a Latency Event was received by that module.

DETAILED DESCRIPTION OF THE INVENTION

Figure 1:
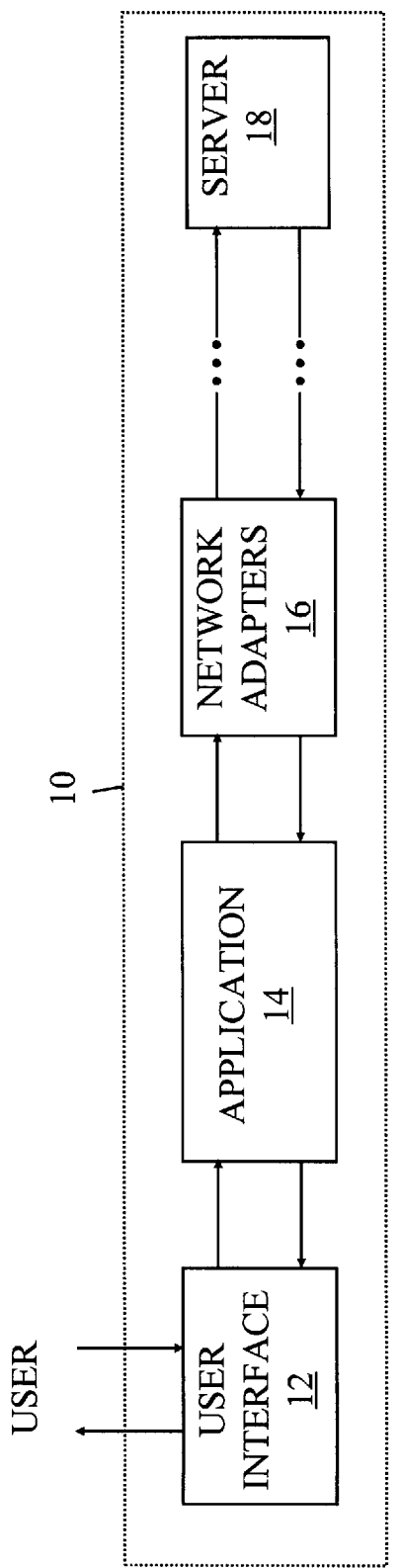
FIG. 1 is a block diagram of a computer system in which the present invention may be practiced.

The present invention is based on the observation that there are a series of events that would not be expected to occur if the computer system was operating in an ideal manner. The first class of such events will be referred to as "Latency Events". Latency Events will be defined more precisely below; however, for the purpose of the present discussion, Latency Events may be viewed as events that would not generally occur if the latency time of the computer with respect to the user's commands was zero. For example, consider the case of a user interface screen which includes a "button" which the user clicks. If the button does not respond within an acceptable period of time, the user often clicks the button a second time. Hence, if the system observes the user repeating a command within a short period of time, and that command would not normally be repeated within that short interval, the system knows that the user is frustrated with the system performance.

Double typing may also be a sign of user frustration. If the user interface does not echo the characters typed quickly enough, the user tends to type the same character string a second time. Typing a character before the last character has been echoed is also a sign that the latency time of the system is too long.

Similarly, the cancellation of a command before it is completed is also more likely to occur if the user is becoming frustrated by the latency time of the computer system. For example, consider a user connected to the Internet who has requested a file from a remote server. If the user does not receive the file within an acceptable period of time, the user will often cancel the request for the file.

While a repeated command or the cancellation of a command are possible without indicating user dissatisfaction, the average number of such events will, in general, be higher if the user is frustrated by the system performance. Hence, the system may utilize such an average to measure user satisfaction.

Knowing that the user is frustrated with the system is not sufficient to take effective action to relieve that frustration. Refer now to FIG. 1 which is a block diagram of a typical computing system. The user typically interacts with a user interface 12 which sends commands to, and receives commands from, an application 14. Application 14 may also send commands to, and receive commands from, a network adapter 16 which connects the user to a server 18 which likewise sends and receives commands. A long latency time can be the result of poor performance by any of these components.

For the purposes of this discussion, a Latency Event will be defined to be an event, or sequence of events, that would not normally be received if the module or component receiving the event, or sequence of events, had a latency time of zero. To identify the component responsible for the poor performance, components that merely pass a command on to the next component are treated differently from a component that actually "consumes" a command. For example, a file request to server 18 is consumed by server 18. The intermediate modules merely repeat the command to the next module in the chain.

In the preferred embodiment of the present invention, each component is responsible for detecting Latency Events of the type consumed by that component. When a component detects such an event, that component logs the event. If the Latency Event is not consumed by the component, it is not logged. Hence, user interface 12 "knows" that it does not service file requests; accordingly, it does not have Latency Events related to repeated file requests or cancellation of a file request before receiving the file. User interface 12, on the other hand, does process button clicks; hence, a repeated button click event is logged by user interface 12.

A number of actions may be taken when the number of logged Latency Events exceeds a predetermined threshold. First, the component logging the events may request a larger time slice from the operating system if the operating system provides such a capability.

Second, the component can refuse to initiate new processes for other users until the number of Latency Events detected per unit time falls below a safe level. In this case, the component may also refer any new tasks to an alternative resource. For example, a server on a network that detects too many Latency Events may refer a file request to a mirror server on the network.

Finally, the component can merely provide this data to system personnel who will utilize the data in designing system upgrades. This is the simplest embodiment of the present invention from an implementation point of view, since it only requires the introduction of the instrumentation code in key modules in the system. The code recognizes events that are to be logged and logs the events on a disk drive for later retrieval. The time at which an event is detected is also useful in some instances. As will be discussed in more detail below, it may also be useful to log the percentage of the server's capacity that is being utilized at the time of the event in the code for instrumenting a server. In this regard, it should be noted that not all components need to be modified. For example, in a network environment, it may be sufficient to instrument only the servers.

There is a second class of events that are indicative of poor system design rather than long latency times; although some of these events may also be interpreted as Latency Events. Consider a program in which a user clicks a menu. If the menu contains the item sought by the user, the user will leave the menu by picking one of the items listed thereon. If the menu does not contain the desired item, the user will leave the menu without picking an item. The later case may be indicative of a poorly designed menu.

This example may be generalized by observing that there is a class of interactions which consist of a sequence of events which will end either in servicing the user or in the user aborting the sequence. If the users who initiate such a sequence frequently abort the sequence, the user interface probably needs to be re-designed. Hence, it is useful to include code which tracks aborted command sequences as well.

A cancellation of a file request from a server before the completion of the file delivery may be due to long latency times as discussed above. Alternatively, such a cancellation may be an aborted command sequence which results from the user seeing the beginning of the file and deciding it was not what he or she wanted. In the later case, the problem is not necessarily the result of a long latency time. A poor user interface design in which the description of the file is misleading can also be the cause of such a cancellation. As noted above, when instrumenting servers, it is useful to include other system information when the event is logged such as the percentage of the server's capacity that is in use at the time of the cancellation of the file request and the file name. If the rate of cancellations increases with the servers utilization, then the events are more likely to be latency events. If, however, a particular file request is often canceled and that cancellation is not strongly correlated with the server's free capacity, then the event is more likely the result of a misleading file description.

The above described description referred to "commands". However, it will be apparent to those skilled in the art that the teachings of the present invention may be applied to any message exchange, not just those messages containing commands. Accordingly, the term "command" includes "message" unless the context indicates otherwise.

Various modifications to the present invention will become apparent to those skilled in the art from the foregoing description and accompanying drawings. Accordingly, the present invention is to be limited solely by the scope of the following claims.

What is claimed is:

1. In a computer system having a plurality of software modules which interact with each other by sending and receiving messages, one of said modules comprising a user interface which receives commands from a user and displays information to said user, said messages comprising messages intended for a module specified in said message, wherein a module receiving one of said messages intended for another one of said modules passes said message to one of said modules that interacts with that module, said computer system being characterized by a latency time defined to be the time between the issuance of a command by said user, said command requesting that information be returned to said user, and the receipt of said information, the improvement comprising providing at least one of said modules with code for recognizing a Latency Event comprising a message for that module that would not normally be received by that module if said computer system had a latency time of zero, said code storing information specifying that a Latency Event was received by that module when that module receives that message.

2. The computer system of claim 1 wherein said Latency Event comprises a command generated by said user inputting a second command prior to the acknowledgment of a first command by said user interface.

3. The computer system of claim 1 wherein said Latency Event comprises a command canceling a previously issued command before the completion of that previously issued command.

4. The computer system of claim 3 wherein said command comprises a request for a file stored on a server in said computer system.

5. The computer system of claim 4 wherein said code further comprises code for recording information identifing said requested file.

6. The computer system of claim 5 wherein said code further comprises code for recording information identifying the state of said server at the time of receipt of said command.

7. The computer system of claim 1 wherein said provided code futher comprises code for recognizing an event comprising an ordered sequence of messages terminating in an end message selected from a predetermined list, said code recording a sequence of messages that matches said first message in said sequence but terminates prior to reaching said end message.

* * * * *